:::
United States Patent
Chen et al.

(10) Patent No.: US 10,911,672 B2
(45) Date of Patent: Feb. 2, 2021

(54) HIGHLY EFFICIENT THREE-DIMENSIONAL IMAGE ACQUISITION METHOD BASED ON MULTI-MODE COMPOSITE ENCODING AND EPIPOLAR CONSTRAINT

(71) Applicant: Nanjing University of Science and Technology, Jiangsu (CN)

(72) Inventors: Qian Chen, Nanjing (CN); Chao Zuo, Nanjing (CN); Shijie Feng, Nanjing (CN); Jiasong Sun, Nanjing (CN); Yuzhen Zhang, Nanjing (CN); Guohua Gu, Nanjing (CN)

(73) Assignee: NANJING UNIVERSITY OF SCIENCE AND TECHNOLOGY, Nanjing (CN)

( * ) Notice: Subject to any disclaimer, the term of this patent is extended or adjusted under 35 U.S.C. 154(b) by 0 days.

(21) Appl. No.: 16/496,845

(22) PCT Filed: Feb. 26, 2018

(86) PCT No.: PCT/CN2018/077215
§ 371 (c)(1),
(2) Date: Sep. 23, 2019

(87) PCT Pub. No.: WO2018/171384
PCT Pub. Date: Sep. 27, 2018

(65) Prior Publication Data
US 2020/0128180 A1  Apr. 23, 2020

(30) Foreign Application Priority Data
Mar. 24, 2017  (CN) .......................... 2017 1 0182704

(51) Int. Cl.
*H04N 13/246*  (2018.01)
*H04N 5/232*  (2006.01)
(Continued)

(52) U.S. Cl.
CPC ..... *H04N 5/23245* (2013.01); *G01B 11/2545* (2013.01); *H04N 13/239* (2018.05); *H04N 13/246* (2018.05)

(58) Field of Classification Search
CPC ............. H04N 5/23245; H04N 13/246; H04N 13/239; H04N 13/2545; G01B 11/2545; G01B 11/254
(Continued)

(56) References Cited

U.S. PATENT DOCUMENTS 5,796,288 A * 8/1998 Krech, Jr. ............ H03K 17/005
327/407
7,724,379 B2 * 5/2010 Kawasaki .......... G01B 11/2509
356/603

(Continued)

FOREIGN PATENT DOCUMENTS

| CN | 101082481 A | 12/2007 |
| CN | 101089547 A | 12/2007 |

(Continued)

OTHER PUBLICATIONS

International Search Report for PCT/CN2018/077215 (PCT/ISA/210) dated Feb. 26, 2018, with English translation.

(Continued)

*Primary Examiner* — Shan E Elahi
(74) *Attorney, Agent, or Firm* — Birch, Stewart, Kolasch & Birch, LLP (57) ABSTRACT

A highly efficient three-dimensional image acquisition method based on multi-mode composite encoding and epipolar constraint, respectively using a fast imaging mode or a high-precision imaging mode, wherein in the fast imaging mode, two phase maps having different frequencies are obtained by four stripe gratings, and a high-frequency absolute phase is obtained by means of the epipolar con-
(Continued)

straint and a left-right consistency check, and the three-dimensional image is obtained by means of a mapping relationship between the phase and three-dimensional coordinates; and in the high precision imaging mode, two phases having different frequencies are obtained by means of N+2 stripe gratings, a low-frequency absolute phase is obtained by the epipolar constraint, and the unwrapping of a high-frequency phase is assisted by means of the low-frequency absolute phase, so as to obtain the high-frequency absolute phase, and finally, the three-dimensional image is obtained by the mapping relationship between the phase and the three-dimensional coordinates. In this way, the imaging efficiency is ensured, and the imaging precision is improved.

14 Claims, 3 Drawing Sheets

(51) Int. Cl.
  *H04N 13/239* (2018.01)
  *G01B 11/25* (2006.01)
(58) Field of Classification Search
  USPC .......................................................... 348/47
  See application file for complete search history.

(56) References Cited

U.S. PATENT DOCUMENTS

| | | | | |
|---|---|---|---|---|
| 8,872,928 B2* | 10/2014 | Jin | ................... | H04N 5/23254 |
| | | | | 348/208.4 |
| 9,013,634 B2* | 4/2015 | Agarwala | ............... | G06T 5/005 |
| | | | | 348/701 |
| 2009/0092311 A1* | 4/2009 | Kim | .................. | G06T 7/85 |
| | | | | 382/154 |
| 2009/0097039 A1* | 4/2009 | Kawasaki | .......... | G01B 11/2509 |
| | | | | 356/603 |
| 2011/0222372 A1* | 9/2011 | O'Donovan | .......... | G01S 3/8083 |
| | | | | 367/103 |
| 2013/0120600 A1* | 5/2013 | Jin | .......................... | G06T 7/262 |
| | | | | 348/208.4 |
| 2013/0128121 A1* | 5/2013 | Agarwala | ........... | H04N 13/221 |
| | | | | 348/607 |
| 2013/0258060 A1 | 10/2013 | Kotake | | |
| 2015/0350678 A1* | 12/2015 | Shimizu | ............... | H04N 19/119 |
| | | | | 375/240.16 |
| 2016/0188994 A1* | 6/2016 | Wu | ......................... | G06T 7/593 |
| | | | | 382/195 |
| 2017/0070751 A1* | 3/2017 | Shimizu | ............... | H04N 19/159 |
| 2017/0178353 A1* | 6/2017 | Smirnov | .............. | H04N 13/239 |
| 2018/0020205 A1* | 1/2018 | Aflalo | ................... | H04N 13/133 |

FOREIGN PATENT DOCUMENTS

| | | | | |
|---|---|---|---|---|
| CN | 101245998 A | | 8/2008 | |
| CN | 101650164 A | | 2/2010 | |
| CN | 102269575 A | | 12/2011 | |
| CN | 103697815 A | | 4/2014 | |
| CN | 103968782 A | | 8/2014 | |
| CN | 104330052 A | | 2/2015 | |
| CN | 104390608 A | * | 3/2015 | ............. G01B 11/25 |
| CN | 105066906 A | | 11/2015 | |
| CN | 106197320 A | | 12/2016 | |
| CN | 106931910 A | | 7/2017 | |
| EP | 1 875 161 B1 | | 6/2014 | |
| JP | 3870275 B2 | | 1/2007 | |

OTHER PUBLICATIONS

Jian et al., "Real-Time Three-Dimensional Measurement Composite of Epipolar Constraint and Speckle Correlation", Acta Optica Sinica, vol. 36, No. 10, Oct. 2016, 11 pages.

* cited by examiner

HIGHLY EFFICIENT THREE-DIMENSIONAL IMAGE ACQUISITION METHOD BASED ON MULTI-MODE COMPOSITE ENCODING AND EPIPOLAR CONSTRAINT

FIELD OF THE INVENTION

The invention belongs to the field of three-dimensional imaging technology, in particular to a highly efficient three-dimensional image acquisition method based on multi-mode composite encoding and the epipolar constraint

BACKGROUND OF THE INVENTION

In the field of three-dimensional imaging, the fast acquisition of high-precision three-dimensional data of target objects has always been an important technical difficulty. In early days, people used the mechanical three-coordinate measuring machine to detect target objects point by point so as to obtain three-dimensional images, but on the one hand this point-by-point contact image acquisition technique is extremely inefficient, and on the other hand the technique damages the measured object. The disadvantages of this technique make it difficult to be applied in areas such as human detection and cultural relics protection. Compared with the traditional mechanical three-dimensional image acquisition technique, the optical three-dimensional image acquisition technique has been widely used in scientific research, industrial inspection and other fields due to its advantages of non-contact and high efficiency. In recent years, with the development of digital projection equipment, fringe projection techniques in optical three-dimensional imaging methods can realize full-field imaging and has become a research hot spot (S. S. Gorthi and P. Rastogi, "Fringe projection techniques: whither we are?" Opt. Eng. 48, 133-140 (2010).). At present, two mainstream techniques in the field of fringe projection are Fourier profilometry (M. Takeda and K. Mutoh, "Fourier transform profilometry for the automatic measurement of 3-d object shapes," Applied optics 22, 3977-3982 (1983).) and phase shift profilometry (V. Srinivasan, H.-C. Liu, and M. Halioua, "Automated phase-measuring profilometry of 3-d diffuse objects," Applied optics 23, 3105-3108 (1984).).

Compared with Fourier profilometry, phase shift profilometry is more suitable for automated high-precision three-dimensional image acquisition due to its insensitivity to ambient light and noise and computational simplicity. Phase shift profilometry obtains the phase of a measured object by projecting a plurality of (at least three) phase shift grating fringes onto the measured object and a synchronously acquiring the grating fringes modulated by the measured object by a camera, and finally the three-dimensional image of the measured object is obtained by means of a phase-height mapping, relationship. How to ensure higher imaging precision at higher imaging efficiency has always been a focus and difficulty in the field of phase shift profilometry. In general, in phase shift profilometry, the more grating fringes that are projected, the more favorable precise phase acquisition is, thereby the more precise three-dimensional image of the measured object can be obtained. However, too many grating fringes will greatly affect the efficiency of phase acquisition and thus affect the speed (efficiency) of three-dimensional image acquisition (Chen Qian; Feng Shijie; Gu Guohua; Zuo Chao; Sun Jiayu; Yu Shiling; Shen Guochen; Li Rubin. A time phase unwrapping method based on dual-frequency three-gray scale sinusoidal grating fringe projection: China, 201410027275.4[1].2013-04-30.). For three-dimensional imaging for dynamic (quasi-static) objects, high imaging efficiency must be required in order to ensure correct imaging. While imaging efficiency has no effect on the final imaging accuracy when measuring static objects, high imaging efficiency still has absolute advantages in the three-dimensional data collection of pipe-lined bulk objects (Long Jiale; Zhang Jianmin; Fan Zhihui. A fast three-dimensional measurement system based on three-wavelength fringe projection: China, 201620177719.7[1].2016-09-07.).

Compared with other methods, three-dimensional imaging technology based on phase shift profilometry has great advantages in measurement mode, imaging efficiency and imaging precision, and it has been widely used in fields such as cultural relic protection and human body detection, but the imaging efficiency and imaging precision must be further improved to overcome the contradiction between the two and thus it can be more widely applied.

SUMMARY OF THE INVENTION

The object of the present invention is to provide a highly efficient three-dimensional image acquisition method based on multi-mode composite encoding and the epipolar constraint, which improves the precision and efficiency of three-dimensional imaging by composite coding and the epipolar constraint.

The technical solution for achieving the object of the present invention is: a highly efficient three-dimensional image acquisition method based on multi-mode composite encoding and the epipolar constraint, with same respectively using a fast imaging mode or a high-precision imaging mode, wherein in the fast imaging mode, two phase maps having different frequencies are obtained by four stripe gratings, and a high-frequency absolute phase is obtained by means of the epipolar constraint and a left-right consistency test, and the three-dimensional image is obtained by means of a mapping relationship between a phase and three-dimensional coordinates; and in the high precision imaging mode, two phases having different frequencies are obtained by means of N+2 stripe gratings, a low-frequency absolute phase is obtained by the epipolar constraint, and the unwrapping of a high-frequency phase is assisted by means of the low-frequency absolute phase, so as to obtain the high-frequency absolute phase, and finally, the three-dimensional image is obtained by the mapping relationship between the phase and the three-dimensional coordinates.

Figure 2:
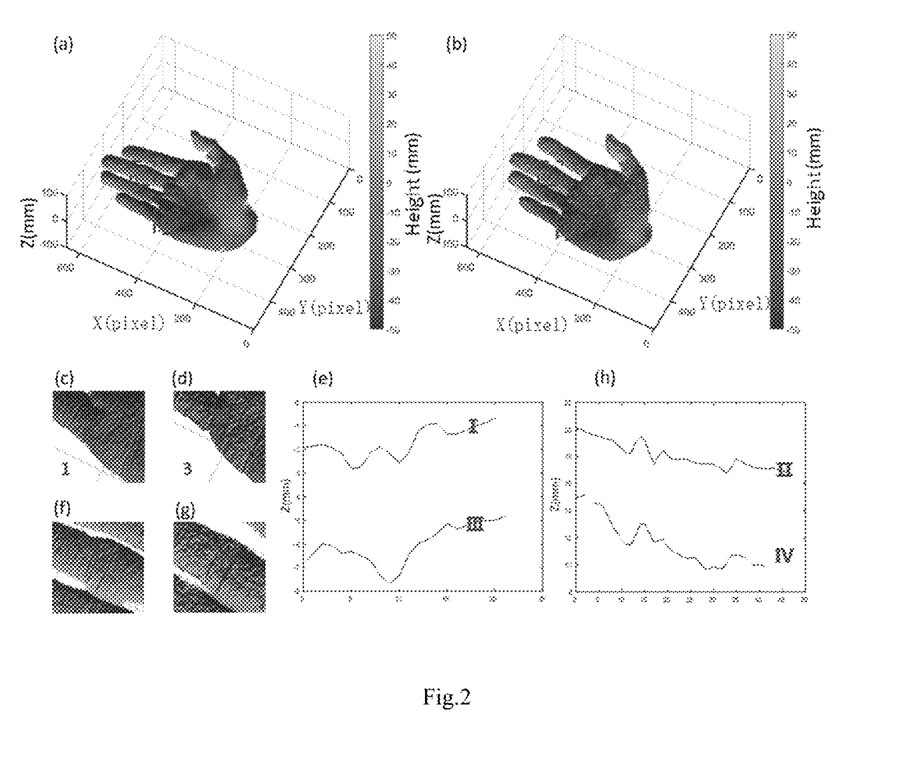
FIG. 2 is the test result of the fast imaging mode.
Figure 4:
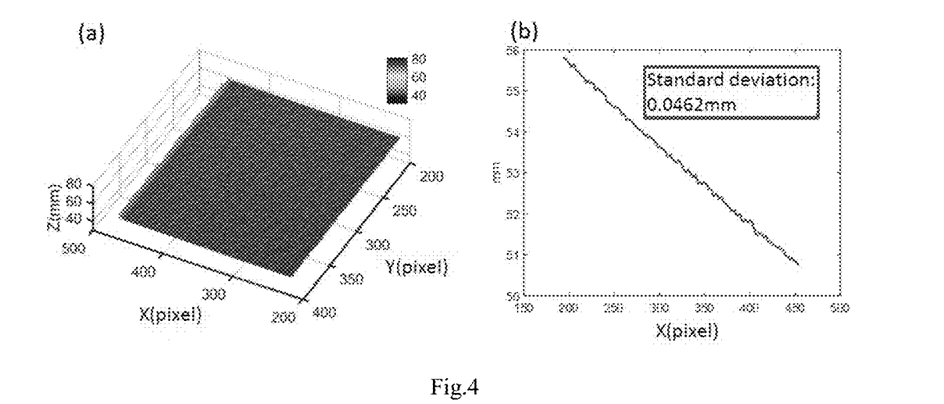
FIG. 4 is the test result of a high-precision imaging mode.

Compared with prior arts, the present invention has significant advantages: (1) The fast imaging mode of the present invention utilizes four grating fringes to obtain a three-dimensional image of the measured object, and compared with the prior art, the combination of the four composite coding grating fringes ensures the high efficiency of three-dimensional image measurement; at the same time, the introduction of the epipolar constraint in the binocular vision enables the technique to obtain high-precision phases with up to 64 fringe periods by using four composite grating stripes, and the high precision of the three-dimensional image is ensured and finally, since the high-frequency absolute phase is directly solved by the epipolar constraint, it does not rely on the low-frequency absolute phase, which avoids the inaccuracy of the three-dimensional image caused by the difference in modulation degree between the two frequency stripe gratings. As shown in FIG. 2, the imaging result of the fast imaging mode of the present invention is finer and has higher imaging precision under the premise of using four fringes. Therefore, the fast imaging mode of the present invention improves imaging accuracy while ensuring imaging efficiency. (2) The high-precision imaging mode of the invention acquires the three-dimensional image of the measured object through the N+2 grating fringes, compared with the prior art, the introduction of the epipolar constraint enables the 8-period low-frequency absolute phase to be directly obtained through the two low-frequency grating fringes, which greatly avoids the redundancy in the prior art that utilizes multi-frame grating fringes (usually much larger than 2) to obtain low-frequency absolute phase, thus improving measurement efficiency. On the other hand, the coding pattern of N 128 fringe periods ensures that the accuracy of the finally acquired three-dimensional image is not lower than the accuracy of the prior art. As shown in FIG. 4, the invention can realize the three-dimensional imaging with an accuracy of 50 um with only five fringes. Therefore, the high-precision imaging mode of the invention greatly improves the imaging efficiency while ensuring imaging accuracy.

The invention is further described in detail below with reference to the accompanying drawings.

BRIEF DESCRIPTION OF THE DRAWINGS

FIG. 2(a) and FIG. 2(b) are respectively the three-dimensional image of a dynamic object acquired by the method and the prior art, and FIG. 2(c) and FIG. 2(f) are partial details of FIG. 2(a), FIG. 2(d) and FIG. 2(g) are partial details of FIG. 2(b), and FIG. 2(e) and FIG. 2(h) are the comparison of partial details.

FIG. 4(a) shows the result of the three-dimensional imaging of a standard ceramic plate, and FIG. 4(b) is a detail display of a line in FIG. 4(a).

DESCRIPTION OF THE PREFERRED EMBODIMENT

Figure 1:
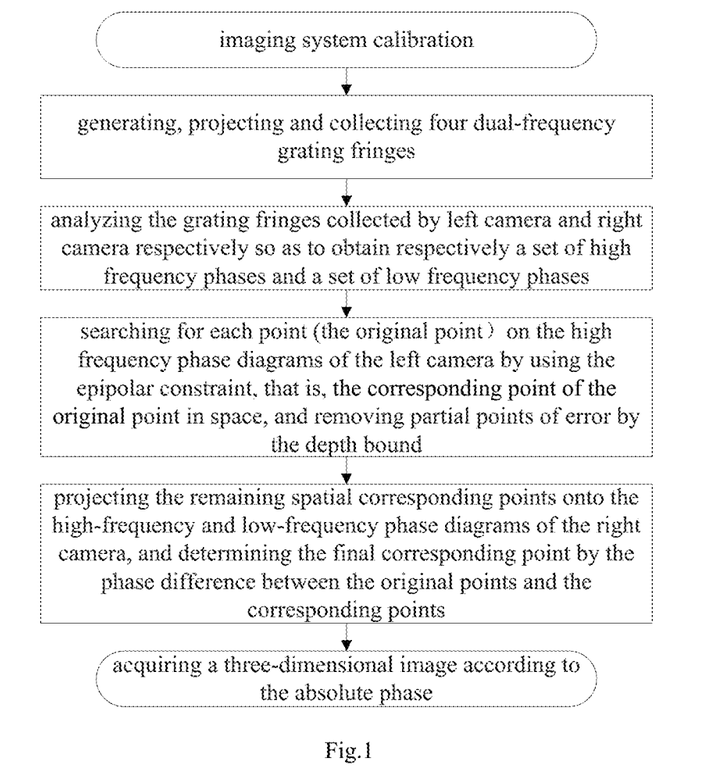
FIG. 1 is the flow diagram of the steps of a fast imaging mode.
Figure 3:
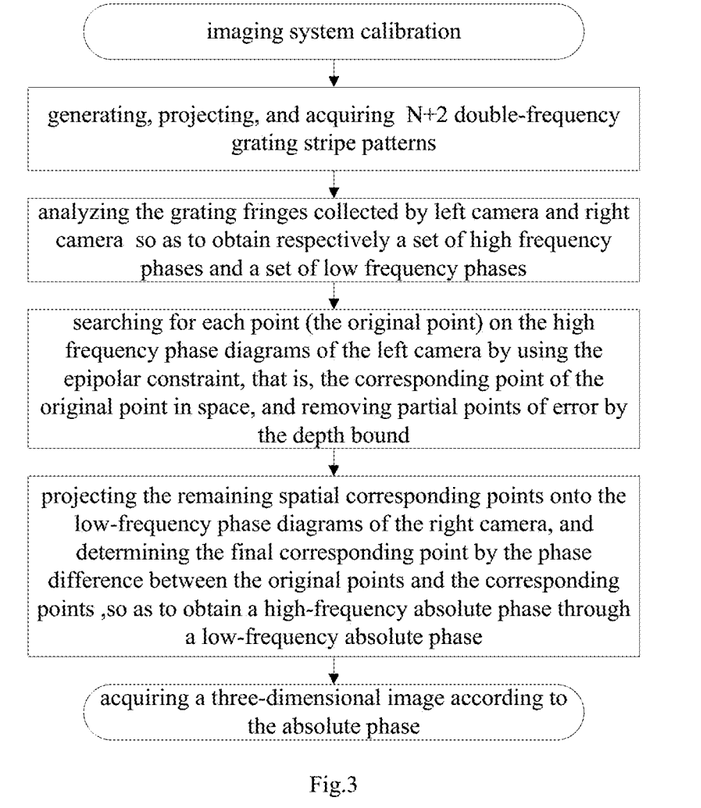
FIG. 3 is the flow diagram of the steps of a high precision imaging mode.

Combining FIG. 1 with FIG. 3, the present invention is based on a highly efficient three-dimensional image acquisition method based on multi-mode composite encoding and the epipolar constraint, respectively using a fast imaging mode or a high-precision imaging mode; the two imaging modes share the same imaging system and the same imaging system calibration results and use the epipolar constraint combing with the auxiliary phase information as the core technology of phase unwrapping. Compared with a traditional multi-frequency time phase unwrapping algorithm, the two imaging modes are greatly improved in efficiency; and compared with a traditional spatial phase unwrapping algorithm, the two imaging modes are greatly improved in efficiency and accuracy. The steps of the fast imaging mode are as follows:

step one, imaging system calibration;
step two, generating, projecting and collecting four dual-frequency grating fringes;
step three, analyzing the grating fringes collected by left camera and right camera respectively so as to obtain a set of high frequency phases and a set of low frequency phases;
step four, searching for each point on the high frequency phase maps of the left camera by using the epipolar constraint, that is, the corresponding point of the original point in space, and removing some error points by the depth constraint;
step five, projecting the remaining spatial corresponding points onto the high-frequency and low-frequency phase maps of the right camera, and determining the final corresponding point by the phase difference between the original points and the corresponding points, so as to obtain a high-frequency absolute phase;
step six, acquiring a three-dimensional image according to the absolute phase, so as to realize efficient and precise acquisition of three-dimensional images of dynamic scenes the high-precision imaging mode comprises the following steps:
step one, imaging system calibration;
step two, generating, projecting, and acquiring N+2 double-frequency grating stripe patterns;
step three, analyzing the grating fringes collected by left camera and right camera respectively so as to obtain a set of high frequency phases and a set of low frequency phases;
step four, using the epipolar constraint to search for each point on the high frequency phase maps of the left camera, that is, the corresponding point of the original point in space, and removing some error points by the depth constraint;
step five, the remaining space corresponding points are projected to the low-frequency phase map of the right camera, projecting the remaining spatial corresponding points onto the low-frequency phase maps of the right camera, and determining the final corresponding point by the phase difference between the original points and the corresponding points, so as to obtain a high-frequency absolute phase through a low-frequency absolute phase;
step six, acquiring a three-dimensional image according to the absolute phase, so as to realize efficient and precise acquisition of three-dimensional images of static scenes.

The process of the two imaging modes is described in detail below.

The flow diagram of the steps of the fast imaging mode of the present invention is shown in FIG. 1, and the specific implementation steps are as follows:

step one, imaging system is calibrated.

The imaging system comprises a computer, a left camera, a right camera, and a projector, wherein the left camera, the right camera and the projector are respectively connected to the computer through data lines, and the projector is connected with the left camera and the right camera through trigger lines; After the imaging system is built, the calibration method mentioned in "A flexible new technique for camera calibration." by Z. Zhang (Z Zhang, "a flexible new technique for camera calibration." IEEE Transactions on pattern analysis and machine intelligence. 22 (11), 1330-1334 (2000).) is used for the imaging system calibration so as to obtain calibration parameters of the left camera, the right camera and the projector in a world coordinate system, wherein the calibration parameters comprise a scaling parameter, a translation parameter, a rotation parameter and a distortion parameter between the pixel coordinate system and the world coordinate system.

step two, four dual-frequency grating fringes are generated, projected and collected. the four dual-frequency grating fringes generated by the computer through MatLab are two sinusoidal stripe gratings and two triangular wave stripe gratings, and the stripe gratings are as follows:

$I_1(x,y)=A(x,y)+B(x,y)\sin[\pi F_H(2x/W-1)]$ $I_2(x,y)=A(x,y)+B(x,y)\cos[\pi F_H(2x/W-1)]$ $$I_3(x,y)=A(x,y)+B(x,y)tri[(2F_Lx/W-1)]$$

$$I_4(x,y)=A(x,y)-B(x,y)tri[(2F_Lx/W-1)]$$

where $I_i(x,y)$ represents the intensity of the grating fringe at the pixel coordinates $(x,y)$ of the generated image, $i=1, 2, 3, 4$ representing the i-th grating fringe image, A is the image DC component, B is the amplitude, and tri is the triangular wave function with threshold interval $[-1, 1]$, $F_H$, $F_L$ is the number of fringe periods included in $I_1$, $I_2$ and $I_3$, $I_4$. W is the pixel width of the entire grating fringe image, $A=B=127.5$, the values for F, are respectively 64 and 9, and the range of values for x is 0 to $W-1$; the gratings are synchronously collected by the left camera and the right camera after being projected by the projector. For the sake of simplicity, only the left camera is analyzed here. The analysis process of the right camera is the same as that of the left camera. The grating fringes collected by the left camera are as follows:

$$I_1^c(x^c,y^c)=\alpha(x^c,y^c)[A(x^c,y^c)+B(x^c,y^c)\sin\Phi_H(x^c,y^c)]+\alpha(x^c,y^c)\beta_1(x^c,y^c)+\beta_2(x^c,y^c)$$

$$I_2^c(x^c,y^c)=\alpha(x^c,y^c)[A(x^c,y^c)+B(x^c,y^c)\cos\Phi_H(x^c,y^c)]+\alpha(x,y)\beta_1(x^c,y^c)+\beta_2(x^c,y^c)$$

$$I_3x(x^c,y^c)=\alpha(x^c,y^c)[A(x^c,y^c)+B(x^c,y^c)\Phi_L(x^c,y^c)]+\alpha(x^c,y^c)\beta_1(x^c,y^c)+\beta_2(x^c,y^c)$$

$$I_4(x^c,y^c)=\alpha(x^c,y^c)[A(x^c,y^c)-B(x^c,y^c)\Phi_L(x^c,y^c)]+\alpha(x^c,y^c)\beta_1(x^c,y^c)+\beta_2(x^c,y^c)$$

where $I_1^c(x^c,y^c)$ is the grating fringe image actually captured by the left camera, $i=1, 2, 3, 4$. $(x^c,y^c)$ is the pixel coordinates of the image captured by the camera, and $\alpha$ is the surface reflectance of the measured object, $\beta_1$ is the reflected ambient light, $\beta_2$ is the ambient light directly into the camera, $\Phi_H(x^c,y^c)$ is the phase included in the grating fringe diagram $I_1^c$ and the grating fringe diagram $I_2^c$, $\Phi_L(x^c,y^c)$ is the phase included in the grating fringe diagram $I_3^c$ and the grating fringe diagram $I_4^c$; assuming $$A^c=\alpha(x^c,y^c)A(x^c,y^c)+\alpha(x^c,y^c)\beta_1(x^c,y^c)+\beta_2(x^c,y^c),B^c=\alpha(x^c,y^c)B(x^c,y^c),$$

and leaving out $(x^c,y^c)$ the above four equations can be reduced to:

$$I_1^c=A^c+B^c\sin\Phi_H$$

$$I_2^c=A^c+B^c\cos\Phi_H$$

$$I_3^c=A^c+B^c\Phi_L$$

$$I_4^c=A^c-B^c\Phi_L$$

The acquisition process of the right camera is the same as the acquisition process of the left camera.

Step three, the grating fringes collected are analyzed by the left camera and the right camera to obtain respectively a set of high-frequency phases and a set of low-frequency phases.

According to the image acquired by the left camera in step two, two sets of phases are obtained as follows:

$$\phi_H = \tan^{-1}\frac{2I_1^c - I_3^c - I_4^c}{2I_2^c - I_3^c - I_4^c}$$

$$\phi_L = \frac{I_3^c - I_4^c}{2B^c},$$

$$B^c = \frac{\sqrt{(2I_1^c - I_3^c - I_4^c)^2 + (2I_2^c - I_3^c - I_4^c)^2}}{2}$$

where $\phi_H$ is a high-frequency wrapped phase and $\phi_L$ is a low-frequency wrapped phase, and the same steps as those of the left camera can be used to determine that the phases corresponding to the stripe gratings collected by the right camera are $\phi_H'$, $\phi_L'$.

Step four, the epipolar constraint is used to search for each point on the high frequency phase maps of the left camera, that is, the corresponding point of the original point in space, and removing some error points by the depth constraint.

For any point p on $\phi_H$, that is, the original point, its cycle order k has $F_H$ possibilities, which means that its absolute phase $$\Phi_H=\phi_H+2k\pi, k\in[0,F_H-1]$$

has $F_H$ different values and from the following formula:

$$x_p = \frac{\Phi_H W}{2\pi F_H}$$

$$Z_p = M_Z + \frac{N_Z}{C_Z x_p + 1}$$

It can be seen that p corresponds to $F_H$ points in the three-dimensional space, that is, $F_H$ corresponding points, wherein $M_Z$, $N_Z$ and $C_Z$ are derived from the calibration parameters obtained in step one (K. Liu, Y. Wang, et al "Dual-Frequency pattern scheme for high-speed 3-D shape measurement." Optics express. 18(5), 5229-5244 (2010).). There is at most one correct corresponding point in the $F_H$ corresponding points. The key to 3D imaging is to identify the only correct corresponding point among the $F_H$ corresponding points. Considering the limited measurement space range in the actual 3D imaging system, the effective range of the left camera, the right camera and the projector is preset as $(Z_{min}, Z_{max})$, such as $Z_{min}=-200$ mm, $Z_{max}=200$ mm, all k which make Z exceeds this preset range and its corresponding spatial points will be confirmed as error points and be eliminated: after this step is processed, the correct cycle order k of p and the range of its spatial corresponding points will be reduced to $F_H'$, where $F_H' \ll F_H$.

Step five, the residuary spatial corresponding points are projected onto the high frequency and low frequency phase maps of the right camera, and the final corresponding point is determined by the phase difference between the original point and the corresponding point, thus obtaining the high frequency absolute phase.

First of all, the residuary spatial points in $(Z_{min}, Z_{max})$ of step four are projected onto the imaging surface of the right camera, and $F_H'$ two-dimensional corresponding points on the imaging surface of the right camera are obtained. In fact, the wrapped phase $\phi_H'$, $\phi_L'$ of the correct corresponding point p' and the wrapped phase $\phi_H$, $\phi_L$ of the original point should be very close, so that, the two-dimensional corresponding points whose $\phi_{diff}$ exceed the threshold of 0.5 rad are further excluded by the formula $$\phi_{diff}=\phi_H(p)-\phi_H'(p')$$

(the rad is the radian unit and the threshold size is a prior determination) where p' is the corresponding point of p on the right camera, $\phi_{diff}$ is the difference between the original point and the corresponding point in the wrapped phases $\phi_H$ and $\phi_H'$, the range of the correct corresponding points is reduced from $F_H'$ to $F_H''$; finally, selecting the corresponding point that makes $\phi_L(p)-\phi_L'(p')$ the smallest among the residuary $F_H''$ corresponding points, and considering the point to be the correct corresponding point; then the cycle order k corresponding to the point is the correct cycle order and thus the unique $\Phi_H$ of the original point is confirmed. Step six, acquiring a three-dimensional image according to the absolute phase.

The three-dimensional image coordinates are obtained by combining the absolute phase $\Phi_H$ obtained in step five with the following formula:

$$x_p = \frac{\Phi_H W}{2\pi N_L}$$

$$Z_p = M_Z + \frac{N_Z}{C_Z x_p + 1}$$

$$X_p = E_X Z_p + F_X$$

$$Y_p = E_Y Z_p + F_Y$$

Where $E_X$, $F_X$, $E_Y$, $F_Y$ are obtained from the calibration parameters in step one (K. Liu, Y. Wang, et al "Dual-frequency pattern scheme for high-speed 3-D shape measurement. "Optics express. 18 (5), 5229-5244 (2010).), $X_P$, $Y_P$, $Z_P$ are the three-dimensional coordinates of the measured object, and thus the three-dimensional image of the measured object can be obtained. It can be seen through the above steps that the fast imaging mode of the present invention utilizes four grating fringes to obtain a three-dimensional image of the measured object, and compared with the prior art, the combination of the four composite coding grating fringes ensures the high efficiency of three-dimensional image measurement; at the same time, the introduction of the epipolar constraint in the binocular vision enables the technique to obtain high-precision phases with up to 64 fringe periods by using four composite grating stripes, and the high precision of the three-dimensional image is ensured and finally, since the high-frequency absolute phase is directly solved by the epipolar constraint, it does not rely on the low-frequency absolute phase, which avoids the inaccuracy of the three-dimensional image caused by the difference in modulation degree between the two frequency stripe gratings.

In order to test the effect of a highly efficient three-dimensional image acquisition method based on multi-mode composite encoding and the epipolar constraint, the present invention gives two sets of test results. FIG. 2(a) and FIG. 2(b) are respectively the three-dimensional image of a dynamic object acquired by the method and the prior art, and FIG. 2(c) and FIG. 2(f) are partial details of FIG. 2(a), FIG. 2(d) and FIG. 2(g) are partial details of FIG. 2(b), and FIG. 2(e) and FIG. 2(h) are the comparison of partial details.

It can be seen from these experimental results that the fast imaging mode of the present invention retains more detailed measurement results than the prior art, and the imaging precision is greatly improved while ensuring high-efficiency three-dimensional imaging.

The flow diagram of the steps of the high-precision imaging mode of the present invention is shown in FIG. 3, and the specific implementation steps are as follows:

Step one, imaging system is calibrated

The imaging system comprises a computer, a left camera, a right camera, and a projector, wherein the left camera, the right camera and the projector are respectively connected to the computer through data lines, and the projector is connected with the left camera and the right camera through trigger lines; After the imaging system is built, the calibration method mentioned in "A flexible new technique for camera calibration." by Z. Zhang (Z. Zhang, 'a flexible new technique for camera calibration." IEEE Transactions on pattern analysis and machine intelligence. 22 (11), 1330-1334 (2000).) is used for the imaging system calibration so as to obtain calibration parameters of the left camera, the right camera and the projector in a world coordinate system.

Step two, N+2 double-frequency grating stripe patterns are generated, projected, and acquired.

N+2 stripe gratings are two low frequency sinusoidal stripe gratings plus N high frequency sinusoidal stripe gratings, where N≤3, for the sake of simplicity, taking N=3 as an example, the stripe gratings are as follows:

$$J_1(x,y)=A(x,y)+B(x,y)\cos[\pi N_H(2x/W-1)]$$

$$J_2(x,y)=A(x,y)+B(x,y)\cos[\pi N_H(2x/W-1)+2\pi/3]$$

$$J_3(x,y)=A(x,y)+B(x,y)\cos[\pi N_H(2x/W-1)+/4\pi3]$$

$$J_4(x,y)=A(x,y)+B(x,y)\sin[\pi N_L(2x/W-1)]$$

$$J_5(x,y)=A(x,y)+B(x,y)\cos[\pi N_L(2x/W-1)]$$

where $J_i(x,y)$ represents the intensity of the grating fringe at the pixel coordinates (x,y) of the generated image, i=1, 2, 3, 4, 5, representing the i-th grating fringe image, and A is the DC component of the image, B is the amplitude, $N_H$, $N_L$ are the number of fringe periods included in $J_1$~$J_3$ and $J_4$, $J_5$ respectively, W is the pixel width of the entire grating fringe image, A=B=127.5, and the values for $N_H$, $N_L$ are respectively 128 and 8, and the range of values for x is 0 to W−1; the gratings are synchronously collected by the left camera and the right camera after being projected by the projector. For the sake of simplicity, only the left camera is analyzed here. The analysis process of the right camera is the same as that of the left camera. The grating fringes collected by the left camera are as follows:

$$J_1^c(x^c,y^c)=\alpha(x^c,y^c)[A(x^c,y^c)+B(x^c,y^c)\cos\Psi_H(x^c,y^c)]+\alpha(x^c,y^c)\beta_1(x^c,y^c)+\beta_2(x^c,y^c)$$

$$J_2^c(x^c,y^c)=\alpha(x^c,y^c)[A(x^c,y^c)+B(x^c,y^c)\cos(\Psi_H(x^c,y^c)+2\pi/3)]+\alpha(x^c,y^c)\beta_1(x^c,y^c)+\beta_2(x^c,y^c)$$

$$J_3^c(x^c,y^c)=\alpha(x^c,y^c)[A(x^c,y^c)+B(x^c,y^c)\cos(\Psi_H(x^c,y^c)+4\pi/3)]+\alpha(x^c,y^c)\beta_1(x^c,y^c)+\beta_2(x^c,y^c)$$

$$J_4^c(x^c,y^c)=\alpha(x^c,y^c)[A(x^c,y^c)+B(x^c,y^c)\sin\Psi_l(x^c,y^c)]+\alpha(x^c,y^c)\beta_1(x^c,y^c)+\beta_2(x^c,y^c)$$

$$J_5^c(x^c,y^c)=\alpha(x^c,y^c)[A(x^c,y^c)+B(x^c,y^c)\cos\Psi_l(x^c,y^c)]+\alpha(x^c,y^c)\beta_1(x^c,y^c)+\beta_2(x^c,y^c)$$

where $J_1^c(x^c,y^c)$ is a grating fringe image actually captured by the left camera, i=1, 2, 3, 4, 5, $(x^c,y^c)$ is the pixel coordinates of the image captured by the camera, and $\alpha$ is the surface reflectance of the measured object, $\beta_1$ the reflected ambient light, $\beta_2$ is the ambient light directly into the camera, $\Psi_H(x^c,y^c)$ is the phase included in the grating fringe diagram $I_1^c$ and the grating fringe diagram $I_x^3$, $\Psi_L(x^c,y^c)$ is the phase included in the grating fringe diagram $I_4^c$ and the grating fringe diagram $I_5^c$; assuming $$A'=\alpha(x^c,y^c)A(x^c,y^c)+\alpha(x^c,y^c)\beta_1(x^c,y^c)+\beta_2(x^c,y^c), B^c=\alpha(x^c,y^c)B(x^c,y^c),$$

and leaving out $(x^c,y^c)$, the above four equations can be reduced to:

$$J_1^c=A^c+B^c\cos\Psi_H$$

$$J_2^c=A^c+B^c\cos(\Psi_H+2\pi/3)$$

$$J_3^c=A^c+B^c\cos(\Psi_H+4\pi/3)$$

$$J_4^c = A^c + B^3 \sin \Psi_I$$

$$J_5^c = A^c + B^c \cos \Psi_I$$

The acquisition process of the right camera is the same as that of the above left camera.

Step three, the grating fringes collected by left camera and right camera respectively are analyzed so as to obtain a set of high frequency phases and a set of low frequency phases, where the phase of the left camera is as follows:

$$\psi_H = \arctan \frac{\sqrt{3}(J_1^c - J_3^c)}{(2J_2^c - J_1^c - J_5^c)}$$

$$\psi_L = \arctan \frac{J_4^c - A^c}{J_5^c - A^c}, A^c = \frac{J_1^c + J_2^c + J_3^c}{3}$$

Where $\psi_H$ is a high-frequency wrapped phase and $\psi_L$ is a low-frequency wrapped phase, and the same steps as those of the left camera can be used to determine that the phases corresponding to the stripe gratings collected by the right camera are $\psi_H'$, $\psi_L'$.

Step four, using the epipolar constraint to search for the corresponding spatial point of each point (original point) on the high frequency phase map of the left camera, and eliminating some error points by the depth constraint.

For any point q on $\phi_L$, that is, the original point, its cycle order k has $N_L$ possibilities, which means that its absolute phase $$\Psi_L = \psi_L + 2\pi, l \in [0, N_L - 1]$$

has $N_L$ different values and from the following formula:

$$x_q = \frac{\Psi_L W}{2\pi N_L}$$

$$Z_q = M_Z + \frac{N_Z}{C_Z x_q + 1}$$

It can be seen that q corresponds to $N_L$ points in the three-dimensional space, that is, corresponding points, wherein $M_Z$, $N_Z$ and $C_Z$ are derived from the calibration parameters obtained in step one (K. Liu. Y. Wang, et al "Dual-frequency pattern Scheme for high-speed 3-D shape measurement." Optics express. 18(5). 229-5244 (2010).); the key to 3D imaging is to identify the only correct corresponding point among the $N_L$ corresponding points. Considering the limited measurement space range in the actual 3D imaging system, the effective range of the left camera, the right camera and the projector is preset as ($Z_{min}$, $Z_{max}$), such as $Z_{min}$=-200 mm, $Z_{min}$=200 mm, all l which make $Z_q$ exceeds this preset range and its corresponding spatial points will be confirmed as error points and be eliminated; after this step, the correct cycle level of q and the range of its spatial corresponding points will be reduced to $N_L'$, where $N_L' \ll N_L$.

Step 5, the residuary spatial corresponding points are projected onto the low frequency phase map of the right camera, and the final corresponding point is determined by the phase difference between the original point and the corresponding point, and the high frequency absolute phase is obtained by means of the low frequency absolute phase.

First of all, the residuary spatial points in ($Z_{min}$, $Z_{max}$) of step four are projected onto the imaging surface of the right camera, and $F_H'$ two-dimensional corresponding points on the imaging surface of the right camera are obtained.

In fact, the wrapped phase $\psi_L'$ the correct corresponding point q' and the wrapped phase $\psi_L$ of the original point should be very close, since $N_L' \ll N_L$, the corresponding point making $\psi_L(p) - \psi_L'(p')$ the smallest can be selected from $N_L'$ corresponding points, and considering that the point is a correct corresponding point, then the corresponding, cycle level l of the correct point is the correct cycle level, so that the unique $\Psi_L$ of the original point is confirmed.

Finally, the final high frequency absolute phase $\Psi_H$ is obtained by the following equation $$l = \text{round}\left(\frac{N_H \Psi_L / N_L - \psi_H}{2\pi}\right)$$

$$\psi_H = \psi_H + 2l\pi$$

Step six, a three-dimensional image is acquired according to the absolute phase.

The coordinates of the three-dimensional image are obtained by combining the absolute phase $\Psi_H$ obtained in step five with the following formula:

$$x_q = \frac{\Psi_H W}{2\pi N_L}$$

$$Z_q = M_Z + \frac{N_Z}{C_Z x_q + 1}$$

$$X_q = E_X Z_q + F_X$$

$$Y_q = E_Y Z_q + F_Y$$

where $E_X$, $F_X$, $E_Y$, $F_Y$ are obtained from the calibration parameters in step one (K. Liu, Y. Wang, et al "Dual-frequency pattern scheme for high-speed 3-D shape measurement." Optics express. 18 (5), 5229-5244 (2010).), $X_q$, $Y_q$, $Z_q$ are the three-dimensional coordinates of the measured object, and thus obtaining the three-dimensional image of the measured object.

From the above four steps, it can be seen that the high-precision imaging mode of the invention acquires the three-dimensional image of the measured object through the N+2 grating fringes, compared with the prior art, the introduction of the epipolar constraint enables the 8-cycle low-frequency absolute phase to be directly obtained through the two low-frequency grating fringes, which greatly avoids the redundancy in the prior art that utilizes multi-frame grating fringes (usually much larger than 2) to obtain low-frequency absolute phase, thus improving measurement efficiency. On the other hand, the coding pattern of N 128 fringe periods ensures that the precision of the finally acquired three-dimensional image is not lower than the precision of the prior art.

In order to test the effect of a highly efficient three-dimensional image acquisition method based on multi-mode composite encoding and the epipolar constraint, one set of experimental results are presented.

FIG. 4(a) shows the result of the three-dimensional imaging of a static object in a high-precision imaging mode, FIG. 4(b) shows the details of a line in FIG. 4(a), and From FIG. 4, it can be seen the high-precision imaging mode of the invention can achieve imaging precision of the static object up to 50 um.

The invention claimed is:

1. A highly efficient three-dimensional image acquisition method based on multi-mode composite encoding and epipolar constraint, comprising the step of:
   using a fast imaging mode, comprising:
      obtaining two phase maps having different frequencies by four stripe gratings;
      obtaining a high-frequency absolute phase by the epipolar constraint and a left-right consistency test; and
      obtaining a three-dimensional image by a mapping relationship between the high frequency absolute phase and three-dimensional coordinates; or
   using a high-precision imaging mode, comprising:
      obtaining two phases having different frequencies by N+2 stripe gratings, wherein the N+2 stripe gratings are two low frequency sinusoidal stripe gratings plus N high frequency sinusoidal stripe gratings, and N is greater than or equal to 3;
      obtaining a low-frequency absolute phase by the epipolar constraint, and assisting an unwrapping of a high-frequency phase by the low-frequency absolute phase;
      obtaining the high-frequency absolute phase; and
      obtaining the three-dimensional image by the mapping relationship between the high-frequency absolute phase and the three-dimensional coordinates.

2. The method according to claim 1, wherein the step of using the fast imaging mode comprises the steps of:
   1) performing a calibration of an imaging system;
   2) generating, projecting and collecting four dual-frequency grating fringes;
   3) analyzing the grating fringes collected by a left camera and a right camera of the imaging system respectively so as to obtain a set of high frequency phases and a set of low frequency phases;
   4) searching for each point on a high frequency phase map of the left camera by using the epipolar constraint, said each point to be searched for being corresponding points of an original point in space, and removing some error points with depth constraint;
   5) a projecting remaining spatial corresponding points onto high-frequency and low-frequency phase diagrams of the right camera, and determining a final corresponding point by a phase difference between original points and the corresponding points, so as to obtain the high-frequency absolute phase; and
   6) acquiring the three-dimensional image according to the high-frequency absolute phase, so as to realize efficient and precise acquisition of three-dimensional images of dynamic scenes.

3. The method according to claim 2, wherein the imaging system comprises a computer, the left camera the right camera, and a projector, the left camera, the right camera and the projector are respectively connected to the computer through data lines, and the projector is connected with the left camera and the right camera through trigger lines, and
   wherein the imaging system is calibrated so as to obtain calibration parameters of the left camera, the right camera and the projector in world coordinate system, and the calibration parameters comprise a scaling parameter, a translation parameter, a rotation parameter and a distortion parameter between a pixel coordinate system and the world coordinate system.

4. The method according to claim 2, wherein in the step 2), the four dual-frequency grating fringes generated by the computer through MatLab are two sinusoidal stripe gratings and two triangular wave stripe gratings, and the stripe gratings are as follows:

$$I_1(x,y)=A(x,y)+B(x,y)\sin[\pi F_H(2x/W-1)]$$

$$I_2(x,y)=A(x,y)+B(x,y)\cos[\pi F_H(2x/W-1)]$$

$$I_3(x,y)=A(x,y)+B(x,y)tri[(2F_L x/W-1)]$$

$$I_4(x,y)=A(x,y)-B(x,y)tri[(2F_L x/W-1)]$$

where $I_i(x,y)$ represents an intensity of the grating fringe at pixel coordinates (x,y) of the generated image, i=1, 2, 3, 4, representing the i-th grating fringe image, A is an image DC component, B is an amplitude, and tri is a triangular wave function with threshold interval [−1, 1], $F_H$, $F_L$ is respectively number of fringe periods included in $I_1$, $I_2$ and $I_3$, $I_4$, W is a pixel width of a entire grating fringe image, A=B=127.5, values for $F_H$, $F_L$ are respectively 64 and 9 and a range of values for x is 0 to W−1,
wherein the gratings are synchronously captured by the left camera and the right camera after being projected by the projector,
wherein the grating fringes collected by the left camera are as follows:

$$I_1^c(x^c,y^c)=\alpha(x^c,y^c)[A(x^c,y^c)+B(x^c,y^c)\sin\Phi_H(x^c,y^c)]+\alpha(x^c,y^c)\beta_1(x^c,y^c)+\beta_2(x^c,y^c)$$

$$I_2^c(x^c,y^c)=\alpha(x^c,y^c)[A(x^c,y^c)+B(x^c,y^c)\cos\Phi_H(x^c,y^c)]+\alpha(x,y)\beta_1(x^c,y^c)+\beta_2(x^c,y^c)$$

where $$I_3^c(x^c,y^c)=\alpha(x^c,y^c)[A(x^c,y^c)+B(x^c,y^c)\Phi_L(x^c,y^c)]+\alpha(x^c,y^c)\beta_1(x^c,y^c)+\beta_2(x^c,y^c)$$

$$I_4^c(x^c,y^c)=\alpha(x^c,y^c)[A(x^c,y^c)-B(x^c,y^c)\Phi_L(x^c,y^c)]+\alpha(x^c,y^c)\beta_1(x^c,y^c)+\beta_2(x^c,y^c)$$

$I_i^c(x^c,y^c)$ is a grating fringe image actually captured by the left camera, i=1, 2, 3, 4,$(x^c,y^c)$ is pixel coordinates of the image captured by the camera, and $\alpha$ is a surface reflectance of a measured object, $\beta_1$ is a reflected ambient light, $\beta_2$ is an ambient light directly into the camera, $\Phi_H(x^c,y^c)$ is a phase included in the grating fringe diagram $I_1^c$ and the grating fringe diagram $I_2^c$, $\Phi_L(x^c,y^c)$ is the phase included in the grating fringe diagram $I_3^c$ and the grating fringe diagram $I_4^c$,
wherein assuming $$A^c=\alpha(x^c,y^c)A(x^c,y^c)+\alpha(x^c,y^c)\beta_1(x^c,y^c)+\beta_2(x^c,y^c), B^c=\alpha(x^c,y^c),B(x^c,y^c),$$

and omitting $(x^c,y^c)$, the above four equations can be rewritten as:

$$I_1^c=A^c+B^c\sin\Phi_H$$

$$I_2^c=A^c+B^c\cos\Phi_H,$$

and $$I_3^c=A^c+B^c\Phi_L$$

$$I_4^c=A^c-B^c\Phi_L$$

wherein an acquisition process of the right camera is the same as an acquisition process of the left camera.

5. The method according to claim 2, wherein the grating fringes collected by the left camera and the right camera respectively are analyzed so as to obtain a set of high frequency phases and a set of low frequency phases, where the phases of the left camera is as follows:

$$\phi_H = \tan^{-1} \frac{2I_1^c - I_3^c - I_4^c}{2I_2^c - I_3^c - I_4^c}$$

$$\phi_L = \frac{I_3^c - I_4^c}{2B^c}, B^c = \frac{\sqrt{(2I_1^c - I_3^c - I_4^c)^2 + (2I_2^c - I_3^c - I_4^c)^2}}{2}$$

where $\phi_H$ is high-frequency wrapped phases and $\phi_L$ is low-frequency wrapping phases, and the same steps as those of the left camera can be used to determine that the phases corresponding to the stripe gratings collected by the right camera are $\phi_H'$, $\phi_L'$.

6. The method according to claim 2, wherein in the step 4), for any point p on $\phi_H$, being the original point, its cycle order k has $F_H$ possibilities, and its absolute phase $$\Phi_H = \phi_H + 2k\pi, k \in [0, F_H - 1]$$

has $F_H$ different values and from the following formula:

$$x_p = \frac{\Phi_H W}{2\pi F_H}$$

$$Z_p = M_Z + \frac{N_Z}{C_Z x_p + 1},$$

wherein p corresponds to $F_H$ points in a three-dimensional space, being $F_H$ corresponding points, wherein $M_Z$, $N_Z$ and $C_Z$ are derived from the calibration parameters obtained in the step 1),
wherein a key to 3D imaging is to identify a only correct corresponding point among the $F_H$ corresponding points, and
wherein an effective range of left camera, right camera and the projector is preset as $(Z_{min}, Z_{max})$, all k which make Z exceeds the preset range and its corresponding spatial points will be confirmed as error points and be eliminated; then a correct cycle order k of p and a range of its spatial corresponding points will be reduced to $F_H'$, where $F_H' \ll F_H$.

7. The method according to claim 2, wherein the step 5) further comprises the steps of:
projecting residuary spatial points in $(Z_{min}, Z_{max})$ in the step 4) onto an imaging surface of the right camera, thus obtaining $F_H'$ two-dimensional corresponding points on the imaging surface of right camera;
excluding two-dimensional corresponding points whose $\phi_{diff}$ exceed a threshold 0.5 rad by $\phi_{diff} \phi_H (p) - \phi_H'(p')$, where p' is the corresponding point of p on the right camera, $\phi_{diff}$ is a difference between the original point and the corresponding points in wrapping phases $\phi_H$ and $\phi_H'$, a range of correct corresponding points is reduced from $F_H'$ to $F_H''$; and
selecting a corresponding point that makes $\phi_L(p) - \phi_L'(p')$ the smallest among the residuary $F_H''$ corresponding points, and considering the point to be a correct corresponding point; then a cycle order k corresponding to the point is a correct cycle order, whereby the unique $\Phi_H$ of the original point is confirmed.

8. The method according to claim 2, wherein the step 6) further comprises the step of:
obtaining the coordinates of the three-dimensional image by combining the absolute phase $\Phi_H$ obtained in the step 5) with the following formula:

$$x_p = \frac{\Psi_H W}{2\pi N_L}$$

$$Z_p = M_Z + \frac{N_Z}{C_Z x_p + 1}$$

$$X_p = E_X Z_p + F_X$$

$$Y_p = E_Y Z_p + F_Y$$

where $E_X$, $F_X$, $E_Y$, $F_Y$ are obtained from the calibration parameters in the step 1), $X_p$, $Y_p$, $Z_p$ are three-dimensional coordinates of the measured object, whereby the three-dimensional a of the measured object can be obtained.

9. The method according to claim 1, wherein the step of using the high-precision imaging mode comprises the following steps:
a) performing a calibration of an imaging system;
b) generating, projecting, and acquiring N+2 double-frequency grating stripe patterns, where N is greater than or equal to 3;
c) analyzing the grating fringes collected by a left camera and a right camera of the imaging system so as to obtain respectively a set of high frequency phases and a set of low frequency phases;
d) searching for each point on high frequency phase maps of the left camera by using the epipolar constraint, said each point to be searched for being corresponding points of an original point in space, and removing some error points with depth restraint;
e) projecting remaining spatial corresponding points onto low-frequency phase diagrams of the right camera, and determining a final corresponding point by a phase difference between the original points and the corresponding points, so as to obtain a high-frequency absolute phase through a low-frequency absolute phase; and
f) acquiring a three-dimensional image according to the absolute phase, so as to realize efficient and precise acquisition of three-dimensional images of static scenes.

10. The method according to claim 9, wherein in the step b), N+2 the N+2 stripe gratings are two low-frequency sinusoidal stripe gratings plus N high-frequency frequency sinusoidal stripe gratings, where N≥3, and when N=3, the stripe gratings are as follows:

$$J_1(x,y) = A(x,y) + B(x,y)\cos[\pi N_H(2x/W - 1)]$$

$$J_2(x,y) = A(x,y) + B(x,y)\cos[\pi N_H(2x/W - 1) + 2\pi/3]$$

$$J_3(x,y) = A(x,y) + B(x,y)\cos[\pi N_H(2x/W - 1) + 4\pi/3]$$

$$J_4(x,y) = A(x,y) + B(x,y)\sin[\pi N_L(2x/W - 1)]$$

$$J_5(x,y) = A(x,y) + B(x,y)\cos[\pi N_L(2x/W - 1)]$$

where $J_i(x,y)$ represents an intensity of the grating fringe at pixel coordinates (x,y) of the generated image, i=1, 2, 3, 4, 5, representing the i-th grating fringe image, and A is a DC component of the image, B is an amplitude, $N_H$, $N_L$ are a number of fringe periods included in $J_1 \sim J_3$ and $J_4$, $J_5$ respectively, W is a pixel width of the entire grating fringe image, A=B=127.5, and values for $N_H$, $N_L$ are respectively 128 and 8, and a range of values for x is 0 to W−1,
wherein the gratings are synchronously collected by the e camera and the right camera after being projected by the projector, wherein the grating fringes collected by the left camera are as follows:

$$J_1^c(x^c,y^c)=\alpha(x^c,y^c)[A(x^c,y^c)+B(x^c,y^c)\cos\Psi_H(x^c,y^c)]+\alpha(x^c,y^c)\beta_1(x^c,y^c)+\beta_2(x^c,y^c)$$

$$J_2^c(x^c,y^c)=\alpha(x^c,y^c)[A(x^c,y^c)+B(x^c,y^c)\cos(\Psi_H(x^c,y^c)+2\pi/3)]+\alpha(x^c,y^c)\beta_1(x^c,y^c)+\beta_2(x^c,y^c)$$

$$J_3^c(x^c,y^c)=\alpha(x^c,y^c)[A(x^c,y^c)+B(x^c,y^c)\cos(\Psi_H(x^c,y^c)+4\pi/3)]+\alpha(x^c,y^c)\beta_1(x^c,y^c)+\beta_2(x^c,y^c)$$

$$J_4^c(x^c,y^c)=\alpha(x^c,y^c)[A(x^c,y^c)+B(x^c,y^c)\sin\Psi_L(x^c,y^c)]+\alpha(x^c,y^c)\beta_1(x^c,y^c)+\beta_2(x^c,y^c)$$

$$J_5^c(x^c,y^c)=\alpha(x^c,y^c)[A(x^c,y^c)+B(x^c,y^c)\cos\Psi_L(x^c,y^c)]+\alpha(x^c,y^c)\beta_1(x^c,y^c)+\beta_2(x^c,y^c)$$

where $J_i^c(x^c,y^c)$ is a grating fringe image actually captured by the left camera, i=1, 2, 3, 4, 5 $(x^c,y^c)$, is pixel coordinates of the image captured by the camera, and $\alpha$ is a surface reflectance of a measured object, $\beta_1$ is a reflected ambient light, $\beta_2$ is an ambient light directly into the camera, $\Psi_H(x^c,y^c)$ is a phase included in the grating fringe map $I_1^c$ and the grating fringe map $I_3^c$, $\Psi_L(x^c,y^c)$ is a phase included in the grating fringe diagram $I_4^c$ the grating fringe diagram $I_5^c$, wherein assuming $$A^c=\alpha(x^c,y^c)A(x^c,y^c)+\alpha(x^c,y^c)\beta_1(x^c,y^c)+\beta_2(x^c,y^c), B^c=\alpha(x^c,y^c)B(x^c,y^c),$$

and omitting $(x^c,y^c)$, the above equations can be rewritten as:

$$J_1^c=A^c+B^c\cos\Psi_H$$

$$J_2^c=A^c+B^c\cos(\Psi_H+2\pi/3)$$

$$J_3^c=A^c+B^c\cos(\Psi_H+4\pi/3),$$

and $$J_4^c=A^c+B^c\sin\Psi_L$$

$$J_5^c=A^c+B^c\cos\Psi_L$$

wherein an acquisition process of the right camera is the same as an acquisition process of the left camera.

11. The method according to claim 9, wherein in the step c), the grating fringes collected by left camera and right camera respectively are analyzed so as to obtain a set of high frequency phases and a set of low frequency phases, where the phase of the left camera is as follows:

$$\psi_H = \arctan\frac{\sqrt{3}\,(J_1^c - J_3^c)}{(2J_2^c - J_1^c - J_3^c)}$$

$$\psi_L = \arctan\frac{J_4^c - A^c}{J_5^c - A^c},\ A^c = \frac{J_1^c + J_2^c + J_3^c}{3}$$

where $\psi_H$ is a high-frequency wrapping phase and $\psi_L$ is a low-frequency wrapping phase, and the same steps as those of the left camera can be used to determine that the phases corresponding to the stripe gratings collected by the right camera are $\psi_H'$, $\psi_L'$.

12. The method according to claim 9, wherein in the step d), for any point q on $\phi_L$, being the original point, its cycle order k has $N_L$ possibilities, and its absolute phase $$\Psi_L = \psi_L + 2l\pi, l \in [0, N_L-1]$$

has $N_L$ different values and from the following formula:

$$x_q = \frac{\Psi_L W}{2\pi N_L}$$

$$Z_q = M_Z + \frac{N_Z}{C_Z x_q + 1},$$

wherein q corresponds to $N_L$ points in a three-dimensional space, being corresponding points, where $M_Z$, $N_Z$ and $C_Z$ are derived from the calibration parameters obtained in the step a), wherein a key to 3D imaging is to identify an only correct corresponding point among $N_L$ corresponding points, and wherein an effective range of the left camera, the right camera and the projector is preset as $(Z_{min}, Z_{max})$, all l which make $Z_q$ exceeds the preset range and its corresponding spatial points will be confirmed as error points and be eliminated; and then a range of correct cycle order q and its spatial corresponding points will be reduced to $N_L'$, where $N_L' \ll N_L$.

13. The method according to claim 9, wherein the step e) further comprises the steps of:

projecting residuary spatial points in $(Z_{min}, Z_{max})$ in step d) onto an imaging surface of the right camera, and obtaining $N_L'$ two-dimensional corresponding points on the imaging surface of the right camera;

confirming an unique $\Psi_L$ of the original point, wherein since $N_L' \ll N_L$, a corresponding point making $\psi_L(p) - \psi_L'(p')$ the smallest can be selected from $N_L'$ corresponding points, and considering that the point is a correct corresponding point, then the corresponding cycle order l of the correct point is a correct cycle order $\Psi_L$; and obtaining the final high frequency absolute phase $\Psi_H$ by the following equation:

$$l = \text{round}\left(\frac{N_H \Psi_L/N_L - \psi_H}{2\pi}\right)$$

$$\psi_H = \psi_H + 2l\pi.$$

14. The method according to claim 9, wherein the step f) further comprises reconstructing the three-dimensional image according to the absolute phase by:

obtaining the coordinates of the three-dimensional image by combining the absolute phase $\Psi_H$ obtained in the step e) with the following formula:

$$x_q = \frac{\Psi_H W}{2\pi N_L}$$

$$Z_q = M_Z + \frac{N_Z}{C_Z x_q + 1}$$

$$X_q = E_X Z_q + F_X$$

$$Y_q = E_Y Z_q + F_Y$$

where $E_X, F_X, E_Y, F_Y$ are obtained from the calibration parameters in the step a), $X_q$, $Y_q$, $Z_q$ are three-dimensional coordinates of the measured object, thereby obtaining the three-dimensional image of the measured object.

* * * * *